March 10, 1959 G. G. EMANUELSSON 2,877,421

PULSE TIME MODULATOR

Filed March 17, 1955 2 Sheets-Sheet 1

INVENTOR
GUNNAR GIDEON EMANUELSSON

By Hane and Nydick
ATTORNEYS

March 10, 1959

G. G. EMANUELSSON 2,877,421

PULSE TIME MODULATOR

Filed March 17, 1955

2 Sheets-Sheet 2

INVENTOR
GUNNAR GIDEON EMANUELSSON
BY Hane and Nydick
ATTORNEYS

United States Patent Office
2,877,421
Patented Mar. 10, 1959

2,877,421

PULSE TIME MODULATOR

Gunnar Gideon Emanuelsson, Hagersten, Sweden, assignor to Telefonaktiebolaget L M Ericsson, Stockholm, Sweden, a corporation of Sweden Application March 17, 1955, Serial No. 494,973

Claims priority, application Sweden November 12, 1954

3 Claims. (Cl. 332—9)

The present invention refers to a device for connecting and disconnecting a current to a load circuit, and more particularly to a pulse time modulator.

Within pulse communication systems there are often, anywhere at the receiver side, duration modulated pulse trains which are to be changed into low frequency voltages corresponding to the signal voltages which have caused modulation of the pulse trains at the receiver side. When such a change takes place a duration modulated pulse train is generally fed to a RC-circuit. The pulses recharge the condenser in the circuit to a voltage proportional to the duration of the respective pulses, and the condenser is discharged during the time interval between the pulses. If the duration modulated pulses have no constant amplitude, the voltage of the condenser is not directly proportional to the duration of the pulses. Thereby the reappearing modulation signal is distorted. This disadvantage is avoided by a device operating according to the present invention.

The device according to the invention is characterized by an arrangement for keeping the current constant, said device being connected to the same electrodes in two elements with unsymmetrical conductivity, the second electrode of the first element thereby being connected to the load circuit, the second electrode of the second element being connected through an impedance to a voltage source with such polarity, that the last mentioned element is normally conductive and the first mentioned element non-conductive. The device is further characterized by means for transmitting to the second electrode of the second element a signal of such polarity and amplitude, that said second element will be non-conductive and the first mentioned element conductive during the time during which the amplitude of the signal exceeds a certain determined value.

The invention will be described more in detail in connection with the attached drawings.

Figure 1:
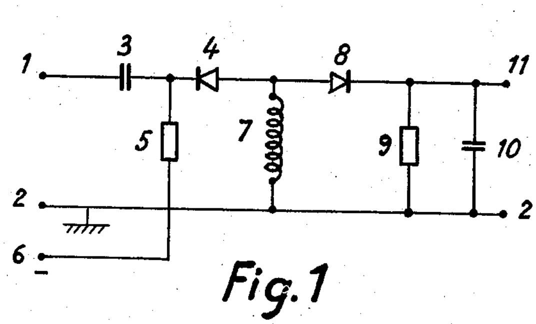
Fig. 1 is a basic circuit diagram of a pulse time modulator according to the invention.

In the embodiment according to Fig. 1, the input terminals of the device are designated by 1 and 2, the latter being grounded. The terminal 1 is connected through a condenser 3 both to the cathode in a diode 4 and to a resistance 5, the other end of which is connected to a voltage source 6 with negative polarity. The anode of the diode 4 is connected both to a coil 7, the other end of which is connected to grounded terminal 2, and to the anode in another diode 8. The cathode of the diode 8 is connected to ground over a resistance 9 being connected in parallel to a condenser 10. The output terminals of the device are designated by 11 and 2.

The device operates in the following manner: Normally a current flows from ground terminal 2 over the coil 7, the diode 4 and the resistance 5 to the negative voltage source 6. The diode 4 is thus conductive and the diode 8 non-conductive, the anode of said latter diode having a potential somewhat negative in relation to ground. A voltage of positive polarity, for instance a positive pulse, is applied to the input terminals of the device. The voltage of the cathode of the diode 4 now decreases to a higher potential than ground, the diode 4 then being non-conductive. During the time during which the current has passed the coil 7 to the negative bias voltage source, the coil has been recharged to a certain electromagnetic energy. When the diode 4 is blocked, said energy will cause a current over the diode 8 and the load circuit 9, 10 to ground. When the pulse fed to the input terminals disappears, the cathode of the diode 4 is again negative in relation to ground. The diode 4 will then be conductive again and the diode 8 non-conductive, so that the current over the coil 7 will flow over the diode 4 and the resistance 5 to the negative bias voltage source 6.

If the pulses fed to the input terminals have short duration in relation to the time interval between the pulses, and if the inductance of the coil is rather high, the electromagnetic energy of the coil will be changed only slightly during the time during which the current over the coil flows to the load circuit 9, 10. The condenser 10 will then be recharged by a constant current during the duration of an applied pulse and discharged by the resistance 9 during the time between the pulses. The recharge of the condenser will take place with constant current irrespective whether the pulses applied to the input terminals have constant amplitude or not, the amplitude of the pulses being so high only that the diode 4 is conductive for the whole duration of a pulse.

Figure 2:
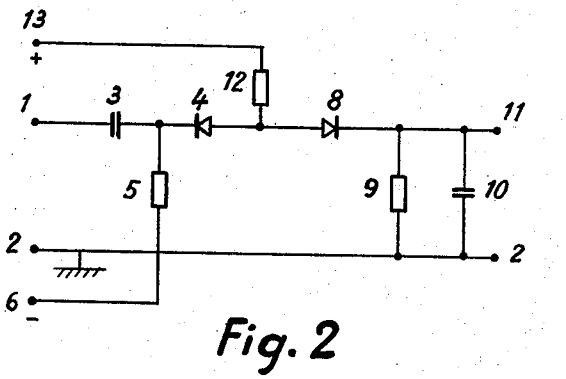
Fig. 2 is a modification of the circuit system of Fig. 1.

Fig. 2 shows another embodiment of the device according to the invention. This differs from the previously described device in that the coil 7, which in Fig. 1 was connected between the anodes of the diodes and ground, is replaced by a resistance 12 connected between the anodes of the diodes and a bias voltage source 13 with positive polarity.

The device operates in a manner similar to the one described before. Thus normally a current flows from the voltage source 13 to the voltage source 6 through the resistance 12, the diode 4 and the resistance 5. The resistances are so chosen, that the diode 8 is non-conductive. When a voltage of positive polarity is applied to the input terminals, the diode 4 is blocked. The current through the resistance 12 will then flow through the diode 8 to the load circuit 9, 10 as long as the diode 4 is blocked. When the applied voltage disappears, the diode 4 is again conductive and the diode 8 non-conductive. During the time during which the diode 8 is conductive, the current to the load circuit is substantially determined by the potential of the bias voltage source 13 and the high resistance 12.

The coil 7 and the resistance 12 respectively together with the bias voltage source serve as constant current devices; they may be replaced by other devices known per se with similar effect.

Figure 3:
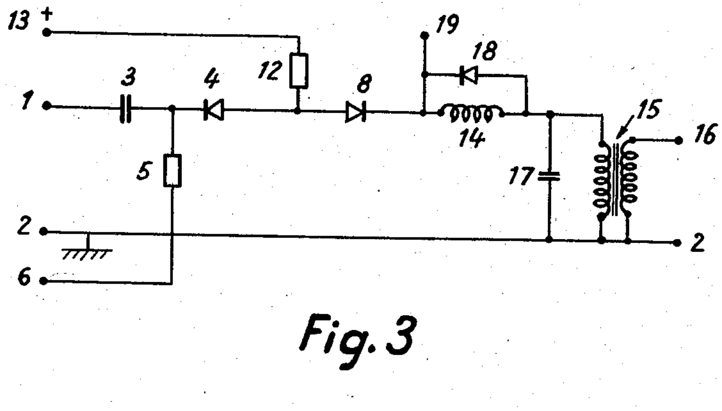
Fig. 3 is a further modification of the circuit system including circuit means for producing time position modulated pulses.

Fig. 3 shows a device according to the invention for producing time position modulated pulses. The device is essentially the same as the device according to Fig. 2. The load circuit 9, 10 is, however, replaced by another load circuit consisting of a coil 14, for instance a high frequency choke coil connected between the cathode of the diode 8 and the secondary winding of the modulation transformer 15, the other end of which is connected to ground. The primary winding of the transformer is connected to the input terminals 16 and 2 and the secondary winding is connected in parallel with a condenser 17. The coil 14 is connected in parallel with a diode 18, the cathode of which is connected both to the cathode of the diode 8 and to an output terminal 19. As a result, coil 14 as connected constitutes a differentiating circuit.

The device operates in the following way. A periodical voltage, for instance a sinusoidal voltage, is applied to the input terminals 1, 2. Also other voltages are possible, for instance a saw-tooth voltage. One condition is, however, that the curve form of the voltage is sloping and rather straight within a certain range, most suitably at the zero passage of the voltage. For the negative half period of the sinusoidal voltage the diode 4 is conductive, so that a current flows from the voltage source 13 through the resistance 12, the diode 4 and the resistance 5 to the voltage source 6. For the positive half period of the sinusoidal voltage the diode 4 is blocked. The current from the voltage source 13 flows in this case through the resistance 12, the diode 8, the coil 14 and the condenser 17 and the secondary winding of the transformer 15 to ground terminal 2. For the time during which the diode 8 is conductive the current over the last mentioned element is substantially determined by the resistance 12 which is rather high. Said current is therefore rather constant for the time during which the diode 8 is conductive. The inductance of the coil 14 is of any importance only when the diode 8 passes from conductive to non-conductive state or vice vera. The current in the coil 14 cannot be changed momentarily and therefore there are then negative and positive potential drops over the coil 14 in the form of negative and positive pulses. The negative voltage pulses are eliminated by the diode 18. Thus between the output terminal 19 and ground 2 only positive pulses are obtained. Said pulses occur at the times during which the diode 8 passes from non-conductive to conductive state. Said times can be varied around their mean values by varying the bias voltage of the diode 8. This is effected by a modulation voltage, for instance a speech voltage, being applied to the input terminals 16, 2 of the transformer 15. If a constant displacement in time of the pulses from their mean values is desired, a direct voltage is applied to the diode 8. This may for instance be effected by the secondary winding of the transformer 15 being connected to a positive or negative bias voltage source instead of being grounded. The switching between ground and the bias voltage source can be effected by a relay controlled for instance by impulse signals such as dial impulses etc. The mean values of the pulses are determined by the voltages of the voltage sources 6 and 13 and by the resistances 5 and 12. These values are suitably adjusted so that when the applied modulation voltage is zero, the diode 8 is conductive or non-conductive, respectively, at the times for the zero passages of the sinusoidal voltage fed to the input terminals 1, 2. The possible amplitude variations of said voltage then do not actuate the time positions of the obtained pulses.

In Fig. 4, terminal 1 is again connected to condenser 3 which in turn is connected partly to the cathode of diode 4 and partly to resistance 5, the other end of which is connected to the bias voltage source 6 with negative potential. The anode of the diode 4 is connected both to the anode in another diode 8, and through a resistance 12 to a bias voltage source 13 with positive polarity. The cathode of the diode 8 is connected to a load consisting of a coil 14, for instance a high frequency choke-coil, which in its turn is connected to the secondary winding in a modulation transformer 15. The primary winding of the transformer is connected to the input terminals 16 and 2, and the secondary winding is connected in parallel with a condenser 17. The coil 14 is connected in parallel with a diode 18, the cathode of which is connected both to the cathode of the diode 8 and to an output terminal 19. A feed-back circuit is connected from the output terminal 19 to the cathode of the diode 4.

The device operates in the following manner: A periodical voltage, for instance a sinusoidal voltage, possibly a saw-tooth voltage, is applied to the input terminals 1 and 2. The condition is that the curve form of the voltage is sloping and rather straight within a certain range, most suitably at the zero passage of the voltage. During the negative half period of the sinusoidal voltage the diode 4 is conductive, so that a current flows from the voltage source 15 through the resistance 12, the diode 4 and the resistance 5 to the voltage source 6. For the positive half period of the sinusoidal voltage on the other hand the diode 4 is blocked. The current from the voltage source 13 flows through the resistance 12, the diode 8, the coil 14, the condenser 17 and the secondary winding of the transformer 15 to grounded terminal 2. For the time during which the diode 8 is conductive, the current over the last mentioned element is substantially determined by the resistance 12 which is rather high. Said current is therefore rather constant, during the time during which the diode 8 is conductive. The inductance of the coil 14 is of any importance, only at the times during which the diode 8 passes from conductive to non-conductive state or vice versa. The current through the coil 14 cannot be changed momentarily, and therefore there are at said times negative and positive potential drops over the coil 14 in the form of negative and positive pulses. The negative voltage pulses are eliminated by the diode 18 and between the output terminal 19 and ground 2 only positive pulses are obtained, which occur at the times during which the diode 8 passes from non-conductive to conductive state. Said times can be varied around their mean values by varying the bias voltage of the diode 8. This is effected by a modulation voltage, for instance a speech voltage, being applied to the input terminals 16 and 2 of the transformer 15. The positive impulse arising in the coil 14 can then be fed through a feed-back circuit back to the input of the device, possibly over an amplifier. Due to this arrangement the above described functions are considerably accelerated. As a result, the output pulses from the terminals 19 and 2 increase rapidly and have a high amplitude in comparison with the arrangement in which said feed-back circuit is omitted.

Figure 4:
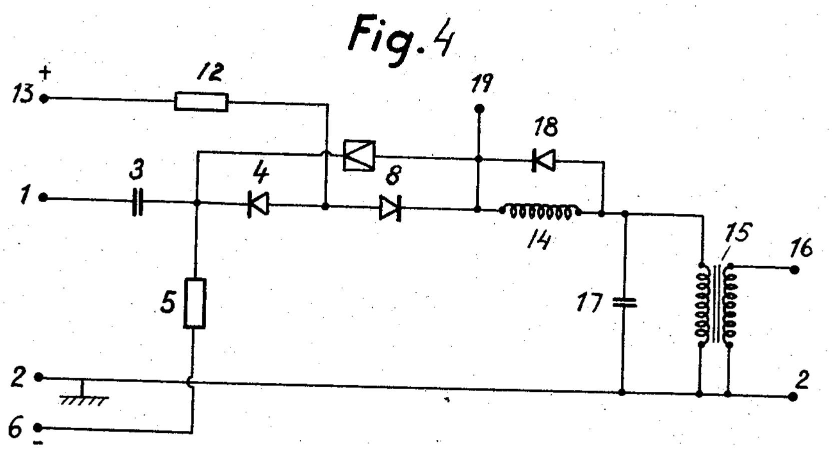
Fig. 4 is a modification of the system according to Fig. 3, including a feed back path.
Figure 5:
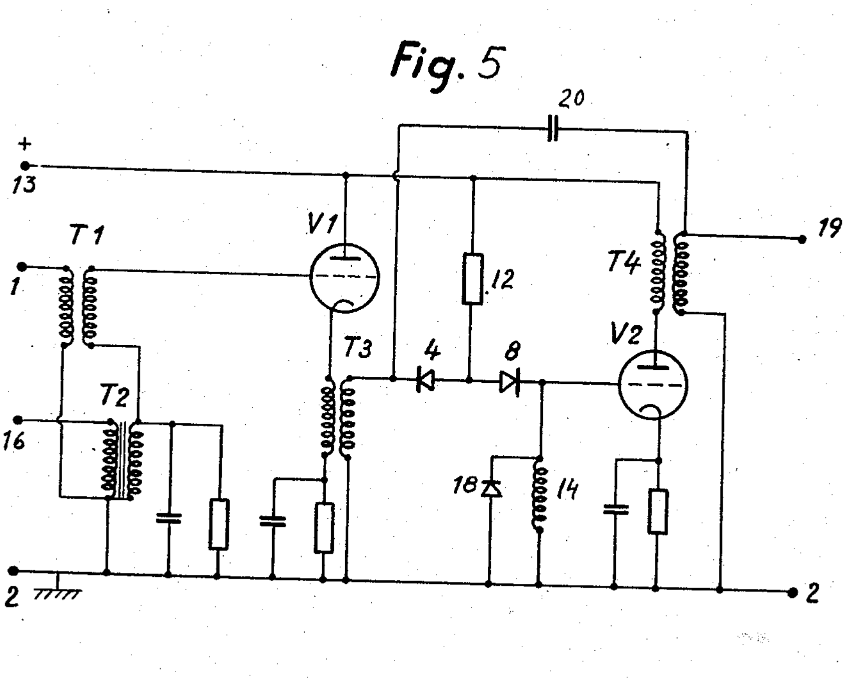
Fig. 5 is a modification of the circuit system of Fig. 4 showing a more elaborate arrangement than Fig. 4.

Fig. 5 shows a particularly useful modification of the device according to Fig. 4. The periodical voltage between the terminals 1 and 2 is applied to the transformer T1 and the modulation voltage between the terminals 2 and 16 to the transformer T2. Said two voltages are added in the transformer T1 and applied to the transformer T3 through an amplifier tube V1. The voltage over the secondary winding of the transformer T3 then actuates the switching device 4, 12, 8 with its load circuit, the coil 14. The pulses appearing over said elements are amplified in an amplifier stage V2, the polarity of said pulses being changed in the pulse transformer T4 and the pulses then appearing as positive pulses on the output terminal 19. The feed-back circuit extends through the connecting condenser 20 to the cathode of the diode 4.

Time position modulated pulses can also be obtained by a superposition of a modulation current on the current through the resistance 12 or the coil 7.

If the pulses or voltages applied to the input terminals are of opposite polarity to what has been supposed, the polarity of all diodes comprised in the device and that of the bias voltage sources 6 and 13 should be reversed.

In all the described embodiments of the invention the two elements with un-symmetrical conductivity are crystal diodes. The invention is, however, not limited to this but also other elements with similar conducting properties are within the scope of the invention.

I claim:

1. A pulse time modulator comprising input and output terminals, two series-connected elements with nonsymmetrical conductivity connecting one of the input terminals to one of the output terminals, said elements having equivalent electrodes connected to each other, a constant current source connected in circuit with said interconnected electrodes for feeding the same, a differentiating circuit connected to the output terminals, bias means for rendering only one of the elements conducting at a time, a source for a periodical wave-form having at least one part with a constant slope connected to the input terminals, means for varying the bias of one of the elements in accordance with a modulated audio frequency voltage, and a feedback path between one of said output terminals and one of said input terminals.

2. A pulse time modulator according to claim 1, wherein said feed back path comprises an amplifier.

3. A pulse time modulator according to claim 1, wherein said differentiating circuit comprises a high frequency choke coil.

References Cited in the file of this patent

UNITED STATES PATENTS

| | | |
|---|---|---|
| 2,616,960 | Dell et al. | Nov. 4, 1952 |
| 2,723,355 | Graham | Nov. 8, 1955 |
| 2,760,160 | Flood et al. | Aug. 21, 1956 |